US006500906B1

(12) United States Patent
Kong et al.

(10) Patent No.: US 6,500,906 B1
(45) Date of Patent: *Dec. 31, 2002

(54) OLEFIN POLYMERIZATION CHELATE CATALYST AND OLEFIN POLYMERIZATION METHOD USING THE SAME

(75) Inventors: Gap-Goung Kong, Taejeon-shi (KR); Sung-Cheol Yoon, Taejeon-shi (KR); Gyo-Hyun Hwang, Taejeon-shi (KR)

(73) Assignee: Samsung General Chemicals, Seosan (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/497,639

(22) Filed: Feb. 3, 2000

(30) Foreign Application Priority Data

Feb. 4, 1999 (KR) .............................. 99-3747

(51) Int. Cl.$^7$ .......................... C08F 4/42; C08F 210/00
(52) U.S. Cl. ................... 526/124.2; 526/119; 526/348; 526/124.2; 526/901; 502/226; 502/123; 502/167; 502/227
(58) Field of Search ................... 502/226, 123, 502/167, 227; 526/119, 348, 124.2, 901, 161

(56) References Cited

U.S. PATENT DOCUMENTS

| | | | | |
|---|---|---|---|---|
| 4,511,703 A | * | 4/1985 | Bailly | 526/125 |
| 5,134,104 A | | 7/1992 | Sasaki et al. | 502/103 |
| 5,439,995 A | | 8/1995 | Bailly et al. | 526/125 |
| 5,455,316 A | | 10/1995 | Tsutsui et al. | 526/114 |
| 5,502,128 A | | 3/1996 | Flores et al. | 526/160 |
| 5,594,079 A | * | 1/1997 | Hara et al. | 526/119 |
| 5,629,390 A | * | 5/1997 | Nishimura et al. | 526/114 |
| 6,114,276 A | * | 9/2000 | Kong et al. | 502/226 |

FOREIGN PATENT DOCUMENTS

| | | |
|---|---|---|
| EP | 0 606 125 | 7/1994 |
| JP | 63-191811 | 8/1988 |
| JP | 6-340711 | 12/1994 |

OTHER PUBLICATIONS

A. Horton, et al. "Cationic Alkylzirconium Complexes Based on a Tridentate Diamide Ligand: New Alkene Polymerization Catalusts", *Organometallics*, vol. 15, No. 12, 1996, pp. 2672–2674.

W. Kim, et al., "[(Ph)$_2$nacnac]MCl$_2$(THF)$_2$ (M =Ti, V, Cr): A New Class of Homogeneous Olefin Polymerization Catalysts Featuring β–Diiminate Ligands", *Organometallics*, vol. 17, No. 21, 1998, pp. 4541–4543.

M. Aizenberg, et al., "Synthesis of Group 4 Complexes That Contain the Tridentate Diamido/Donor Ligands [(AryINCH$_2$CH$_2$)$_2$O]$^{2-}$ and Zirconium Complexes That Contain [(AryINCH$_2$CH$_2$)$_2$S]$^{2-}$ and an Evaluation of Their Activity for the Polymerization of 1–Hexene", *Organometallics*, vol. 17, No. 22, 1998, pp. 4795–4812.

D. Stephan, et al., "Remarkably Active Non–Metallocene Ethylene Polymerization Catalysts", *Organometallics*, vol. 18, No. 11, 1999, pp. 2046–2048.

S. Tinkler, "Polymerisation of ethene by the novel titanium complex [Ti(Me$_3$SiNCH$_2$CH$_2$NSiMe$_3$)Cl$_2$]; a metallocene analogue", *Chem. Commun.*, 1996, pp. 2623–2624.

A. van der Linden, et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species", *Journal of the American Chemical Society*, Vol. 117, No. 11, March 22, 1995, pp. 3008–3021.

B. Qian, et al., "Synthesis, Structure, and Reactivity of β–Diketiminato Aluminum Complexes", *Organometallics*, vol. 17, No. 14, Jul. 6, 1998, pp. 3070–3076.

R. Lowenthal, et al., "Asymmetric Catalytic Cyclopropanation of Olefins: Bis–Oxazoline Copper Complexes", *Tetrahedron Letters*, vol. 31, No. 42, Oct. 8, 1990, pp. 6005–6008.

J. Scollard, et al., "Living Polymerization of α–Olefins by Chelating Diamide Complexes of Titanium", *Journal of the American Chemical Society*, vol. 118, No. 41, 1996, pp. 10008–10009.

C. Averbuj, et al., "Stereoregular Polymerization of α–Olefins Catayzed by Chiral Group 4 Benzamidinate Complexes f C$_1$ and C$_3$ Symmetry", *Journal of the American Chemical Society*, vol. 120, No. 34, 1998, pp. 8640–8646.

* cited by examiner

*Primary Examiner*—David W. Wu
*Assistant Examiner*—Ling-Siu Choi
(74) *Attorney, Agent, or Firm*—Fitzpatrick, Cella, Harper & Scinto

(57) ABSTRACT

This invention relates to transition metal catalyst component chelated by chelate ligand, a catalytic system comprising the transition metal catalyst component in the presence of magnesium halide, and a process for olefin polymerization using the catalytic system. The preparation of chelated transition metal catalyst component[A] are prepared by the unique synthetic method, in which Mg[AlR'(OR)$_3$]$_2$ reacts with chelate ligand to form Mg—Al-chelate ligand complex containing chelate ligand, and this complex reacts with metal halide compound to prepare chelated transition metal compound which is quite soluble in non-polar solvents. The olefin polymerization is performed using a catalytic system comprising the chelated transition metal catalyst component [A], MgCl$_2$ support component[C], and an organoaluminum cocatalyst component[B]. Such polymerization produces a polymer having narrow molecular weight distribution, narrow compositional distribution, excellent morphology, and good processibility.

6 Claims, No Drawings

OLEFIN POLYMERIZATION CHELATE CATALYST AND OLEFIN POLYMERIZATION METHOD USING THE SAME

FIELD OF THE INVENTION

This invention relates to chelated transition metal catalyst component in the presence of magnesium halide, a process for olefin polymerization using said catalyst component, and, more particularly, novel olefin polymerization catalyst containing transition metal compound chelated by chelate ligand which can copolymerize ethylene and α-olefin and produce a polymer having a narrow molecular weight distribution and compositional distribution.

BACKGROUND OF THE INVENTION

Metallocene compounds are known to be an excellent catalyst for (co)polymerization of olefin and have been improved through the modification of cyclopentadienyl ligand to indenyl ligand, fluorenyl ligand, or bridged ligand. Also, there have been developments of supported metallocene catalytic system producing polyolefin with excellent morphology, which can be applied to slurry process or gas phase polymerization process. For example, in U.S. Pat. Nos. 5,439,995 or 5,455,316, they reported that the supported titanium metallocene or zirconium metallocene catalytic system showed excellent copolymerization and morphology properties. However, they still have some disadvantages such as synthetic difficulties, modification of existing polymerization process, and poor processibility of the produced polymer due to its narrow molecular weight distribution. Also, the activating components for metallocene catalysts such as MAO(methylaluminoxane) compounds or boron compounds are still quite expensive to be applied for polyolefin materials with general purpose.

Recently, they have been employing oxygen or heteroatom bound chelated transition metal compound as homogeneous catalysts for olefin polymerization, which are called non-metallocene catalysts or organometallic catalysts, and it attracted much attention, because these compounds are easier to synthesize than metallocene compounds and are known to show equivalent properties to metallocene compounds. Similar to the metallocene catalysts, these catalysts are anticipated to display excellent (co)polymerization ability, and there have been active investigation of oxygen or heteroatom bound chelated transition metal compounds as a catalyst component.

Japanese Laid-Open Patent sho 63-191811 disclosed the chelated catalysts for ethylene and propylene polymerization where chlorides of titanium chloride compound are replaced by TBP ligand(6-tert-butyl-4-methylphenoxy), and methylaluminoxane(MAO) is used as a cocatalyst. It was reported that polymerization of ethylene and propylene yielded polymer with excellent activity and high molecular weight(Mw=3,600,000). U.S. Pat. No. 5,134,104 reported chelate catalysts employing amine ligand substituted halide titanium compound, $\{(C_8H_{17})_2NTiCl_3\}$, and the results of olefin polymerization with these catalysts. And in J. Am. Chem. Soc., 117, 3008, catalysts using oxygen bound chelated transition metal compounds which localize the coordination sphere of transition metal compounds were introduced. Also, transition metal compounds chelated with phenoxy derivative ligands were reported in Japanese Laid-Open Patent hei 6-340711 and EP 0606125A2, which produce high molecular weight polymer having narrow molecular weight distribution with MAO as cocatalyst.

However, the investigated organometallic catalyst or nonmetallocene catalysts have never reported examples of copolymerization of α-olefin, and they have never been used as a heterogeneous catalyst for olefin polymerization, which can control the morphology of polymer. Also, they have never reported examples of polymer having broad molecular weight distribution, which shows good processibility. On the other hand, conventional $TiCl_4$ based Ziegler-Natta catalyst, being heterogeneous catalyst, can produce a polymer having good morphology, good processibility, and broad molecular weight distribution. However, when low to medium density polyethylene is desired to obtain using conventional $TiCl_4$ based Ziegler-Natta catalyst, compositional distribution of the resulting copolymer tends to be very broad. Furthermore, high quality copolymers capable of being formed into films having excellent transparency, antiblocking property and heat sealing property are difficult to be obtained.

Therefore, the catalyst having hybrid character between conventional Ziegler-Natta catalyst and single site catalyst, which can produce the copolymer having narrow compositional distribution and good morphology and processibility, has been desired.

OBJECTIVE OF THE INVENTION

The objective of this invention is to provide the catalytic system for olefin polymerization employing chelated transition metal compound containing chelate ligand in the presence of $MgCl_2$ material having a spherical shape as support, which are capable of giving ethylene/α olefin copolymer having narrow molecular weight distribution, narrow compositional distribution, excellent morphology, and good processibility.

SUMMARY OF THE INVENTION

According to this invention, the olefin polymerization catalytic system comprises chelated transition metal catalyst component[A], $MgCl_2$ support component[C], and aluminum cocatalyst component[B].

The preparation of chelated transition metal catalyst component[A] are prepared by the unique synthetic method, in which $Mg[AlR'(OR)_3]_2$ reacts with chelate ligand to form Mg—Al-chelate ligand complex containing chelate ligand, and this complex reacts with metal halide compound to prepare chelated transition metal compound which is quite soluble in non-polar solvents.

Aluminum cocatalyst component[B], to activate the catalyst component[A], employs general organoaluminum compounds of formular $R_3Al$ or $R_2AlCl$ (R=hydrocarbon). And the catalytic system of this invention does not have to use expensive MAO(methyl aluminoxane) or boron compounds are cocatalyst.

$MgCl_2$ support component[C] is solid $MgCl_2$ having a spherical shape which can be prepared from the known method or $MgCl_2$ on the surface of silica which is available from the supplier.

The catalytic system of this invention may be used to produce ethylene copolymer from ethylene and at least one alpha-olefin having 3 or more carbon atoms in which the copolymer has narrow molecular weight distribution, narrow comonomer compositional distribution, excellent morphology, and good processibility.

These and other features, aspects, and advantages of this invention will become better understood with reference to the following description and appended claims.

DETAILED DESCRIPTION OF THE INVENTION

In this invention, the term "polymerization" used herein is intended sometimes to include not only homopolymerization but also copolymerization, and the term "polymer" used herein is intended sometimes to include not only homopolymer but also copolymer.

According to this invention, the chelated transition metal catalyst component[A] is prepared by the reaction of Mg[AlR'(OR)$_3$]$_2$ with chelate ligand to form Mg—Al-chelate ligand complex [M-2] containing chelate ligand as described in equation (1-1)

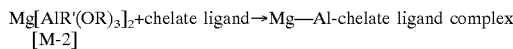
Mg[AlR'(OR)$_3$]$_2$+chelate ligand→Mg—Al-chelate ligand complex [M-2]

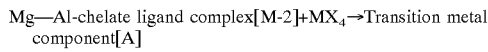
Mg—Al-chelate ligand complex[M-2]+MX$_4$→Transition metal component[A]

where R and R' are independently alkyl or aryl group; M is Ti or Zr; X is halogen atom.

Mg[AlR'(OR)$_3$]$_2$ can be prepared through the reaction of R'$_2$Mg with Al(OR)$_3$. Al(OR)$_3$ is simply prepared by adding ROH to AlR"$_3$, where R, R' and R" are independently alkyl or aryl group. The reaction of AlR"$_3$ with ROH produces exothermic heat and liberate R"H. The exothermic heat and liberation speed of R"H can be controlled through the slow addition of ROH to AlR"$_3$. The mole ratio of AlR"$_3$ to ROH is preferred to be 1:3. The reaction of Al(OR)$_3$ with R'$_2$Mg produces mild heat of 5° C., and the reaction goes smoothly at the room temperature. The mole ratio of Al(OR)$_3$ to R'$_2$Mg is preferred to be 1:2, and the reaction is completed by stirring the mixture of two components for 3 to 5 hours.

Mg—Al-chelate ligand complex[M-2] containing chelate ligand can be obtained by the reaction of Mg[AlR'(OR)$_3$]$_2$ with chelate ligand with mole ratio of between 1:1 and 1:2. Depending on the type of chelate ligand, the reaction could produce mild heat. However due to the Al(OR)$_3$ complexation, the exothermic heat is usually not produced, and the reaction could be done at the room temperature. Depending on the ligand type, the reaction time could be changed, but generally the reaction needs to be done for at least 6 hours to complete at the room temperature. Regarding chelate ligand compounds, various types of chelate ligands can be employed for the purpose of this invention. For example, carbodiimide type compounds such as dimethylcarbodiimide, dicyclohexylcarbodiimide, 1,3-bis-trimethylsilylcarbodiimide and the like; or diketiminato type compounds such as 2-(p-tolylamino)-4-(p-tolylimino)-2-pentene, 2-((2,6-diisopropylphenyl)amino)-4-((2,6-diisopropylphenyl)imino)-2-pentene and the like may be used. The preparation method for diketiminato type ligands are reported in Organometallics 1998, 17, 3070 and Tetrahedron Letter 1990, 31, 6005.

Transition metal catalyst component [A] containing chelate ligand can be prepared through the methathesis reaction of Mg—Al-chelate ligand complex[M-2] with metal halide compound such as TiCl$_4$, TiBr$_4$, TiCl$_2$(OR)$_2$, TiCl$_3$(OR), TiBr$_2$(OR)$_2$, and TiBr$_3$(OR) (where, R is alkyl or aryl group) at the room temperature. To help the separation of MgCl$_2$ or to cause a smoother reaction, it is preferred to use Lewis base adduct of metal halide such as TiCl$_4$(THF)$_2$. The reaction needs at least 12 hours to complete at the room temperature, and the separation of MgCl$_2$ can be done easily through the filtration since MgCl$_2$ is not soluble at all in hydrocarbon solvents. As a medium for reaction, non-polar solvents such as aliphatic or aromatic hydrocarbon solvents are preferred.

One of the specific feature of this invention is that the preparation method of chelated transition metal catalyst component does not include any complicated separation procedure or any heating so that the industrial scale preparation of this chelated transition metal catalyst component can be done simply without complication. Also, instead of using lithium salt or potassium salt compounds in the methathesis reaction to attach the chelating amide ligand to a metal, the incorporation of the unique Mg[AlR'(OR)$_3$]$_2$ compound which is soluble in non-polar solvents such as aliphatic or aromatic hydrocarbon makes the preparation much simpler and easier to do, since it does not include any polar solvents such as ether or THF to complete the methathesis reaction which is usually done in polar solvents. After the separation of MgCl$_2$ from the reaction medium, the chelated transition metal catalyst component[A] solution in non-polar solvent medium is used without further purification or separation, since usually the specific incorporation of Mg[AlR'(OR)$_3$]$_2$ compound does make the chelated transition metal catalyst component[A] readily soluble in non-polar solvents such as aliphatic or aromatic hydrocarbon.

The MgCl$_2$ support component[C] having excellent morphology may be prepared through the various known methods such as recrystallization of MgCl$_2$ from electron donating solvents and the reaction of Grignard reagent with alkyl halides. Alternatively, silica containing 3~5% MgCl$_2$ which is available from the supplier such as Grace Co. may be used.

The unique solubility of chelated transition metal catalyst component[A] in non-polar solvent enables a unique polymerization process, in which chelated transition metal catalyst component[A] in non-polar solvent, not being supported on MgCl$_2$ support component[C], is directly put into the polymerization reactor in the presence of the separate MgCl$_2$ support component[C] in the form of solid and cocatalyst component[B] to polymerize ethylene or ethylene/alpha-olefin. That is, chelated transition metal catalyst component [A] is not necessarily supported on the MgCl$_2$ support component[C] to act as a catalyst. With separate injection of MgCl$_2$ support component[C] and chelated transition metal catalyst component[A] into the reactor, the excellent morphology of polymer can be obtained in the slurry process. Also regarding the gas phase polymerization, through the prepolymerization as explained in the examples, the dry form of prepolymerized catalyst can be prepared to be injected to gas phase process to get polymer with excellent morphology.

Also, the immobilization procedure may be done by simply stirring the slurry mixture of the chelated transition metal catalyst component[A] in non-polar solvent and MgCl$_2$ support component[C] at mild temperature such as 40 to 50° C. The temperature of 50° C. is preferred. The ratio of the chelated transition metal catalyst component[A] to the MgCl$_2$ support component[C] is preferred to be 0.3 to 1 mmol per gram of MgCl$_2$ support component[C]. After stirring the slurry mixture for about 3 hours, the supernant liquid portion is decanted and washed with hexane or heptane five times to get chelated transition metal catalyst component[A] supported on the inorganic support.

Ethylene (co)polymerization may be done using the catalytic system of this invention, which can employ either the catalyst component[A] in the form of solution with the separate MgCl$_2$ support component[C] or the catalyst component[A] in the form of solid supported on the surface of MgCl$_2$ support component[C], with organoaluminum compound as a cocatalyst component[B].

The catalyst component[A] can produce polymers having narrow molecular weight distribution(M.W.D.) or narrow compositional distribution. Therefore, the organoaluminum compound as a cocatalyst component[B] is not necessarily MAO(methylaluminoxane), modified MAO products or boron compounds to produce copolymers having narrow M.W.D. or narrow compositional distribution. With conventional organoaluminum compounds of the formular AlR$_n$Cl$_{3-n}$, where R=alkyl group and n=2 or 3, as a cocatalyst component[B] such as TEA(triethylaluminum), TIBA (triisobutylaluminum), TMA(trimethylaluminum), TOA (trioctylaluminum), diethylaluminumchloride, and diethylaluminumsesquichloride.

With the catalyst component[A] in the presence of MgCl$_2$ support component[C] and organoaluminum cocatalyst component[B] described in the above, ethylene can be copolymerized with an alpha-olefin having 3 to 10 carbon atoms, preferably 4 to 8 carbon atoms. Examples of the alpha-olefin having 4 to 8 carbon atoms include 1-butene, 1-pentene, 1-hexene, and 4-methyl-1-pentene.

In the polymerization process of this invention, the copolymerization of ethylene with alpha-olefin can be carried out in the liquid or gas phase in the presence of or absence of inert polymerization solvents such as hexane, octane, and cyclohexane. The amount of the chelated transition metal catalyst component[A], being supported or separated, can be varied. Measured per liter in the polymerization reaction zone, the chelated transition metal catalyst component[A] is used in an amount of preferably about 0.001 to about 0.5 millimoles per liter, calculated as transition metal atom. The ratio of chelated transition metal catalyst component[A] to MgCl$_2$ support component[C] can be varied from 1.0 mmol/g-MgCl$_2$ to 0.3 mmol/g-MgCl$_2$. The organoaluminum cocatalyst component[B] is used in such an amount that the aluminum to transition metal atomic ratio is approximately from 5 to 100. The polymerization temperature may be approximately 40° C. to 100° C., and (co)polymerization may be performed in the presence of hydrogen to control the molecular weight of (co)polymer.

In this invention, the ethylene copolymer having a density of 0.910 to 0.945 g/cm' can be produced without causing any problems such as the formation of substantial amount of ethylene copolymers soluble in hydrocarbon solvents and consequently the increase of viscosity of the copolymer solution causing reduction in stirring efficiency, blockage of pipes, and low efficiency of separating the copolymer from the reaction solvent. Also, the catalyst component[A] according to this invention can polymerize ethylene copolymer, having a density of 0.910 to 0.945 g/cm' in gas phase process, without any reactor fouling through direct catalyst feeding to gas phase reactor or through prepolymerization, of which prepolymerized catalyst is fed to gas phase reactor. Specially, the catalytic system of this invention is suitable to polymerize ethylene copolymer having density of 0.910 to 0.945 g/cm' with narrow molecular weight distribution and comonomer compositional distribution, and in turn, the ethylene copolymer can be used to produce a film having high impact strength property. Also, by using MgCl$_2$ support component[C] having a spherical shape, either the catalyst component[A] being supported or separated, the catalytic system of this invention provides excellent morphology of polymer having bulk density of 0.40~0.45 g/cm' and a spherical shape.

EXAMPLE 1

All the preparation was done under the nitrogen environment with schlenk line technique, and solvents are dried by a suitable method such as distillation before they are used.

Preparation of Chelated Titanium Catalyst Component[A1]

800 ml of hexane solution of 1 M triethylaluminum(800 mmol) was placed in a 3-liter flask, and 2400 mmol of 2-ethylhexanol was added with dropwise method for 1 hour. While 2-ethylhexanol was added, gas was produced with mild heat. After finishing addition, the mixture was stirred for additional 2 hours at the room temperature to complete the reaction. 400 ml of heptane solution of 1.0 M dibutylmagnesium was added to Al(OR)$_3$ solution prepared in the above at the room temperature and stirred for 2 hours to prepare Mg[AlR'(OR)$_3$]$_2$ in hexane-heptane mixed solution (R=2-ethylhexyl, R'=butyl, isobutyl). Then, Mg[AlR'(OR)$_3$]$_2$ solution was added to 82.4 g of dicyclohexylcarbodiimide in a 3-liter flask and stirred for 3 hours at the room temperature. The reaction produced mild heat. As the reaction proceeded, the color of solution turned into pale yellow and, finally, resulted into clear pale yellow solution of Mg—Al complex containing carbodiimide ligand. The total volume of the solution was 1400 ml.

Meanwhile, 133.7 g of TiCl$_4$(THF)$_2$ was placed into a 5-liter flask, and 600 ml of hexane was added to make a slurry solution. The 1400 ml of Mg—Al complex solution prepared in the above was added to TiCl$_4$(THF)$_2$ slurry mixture and stirred for 6 hours. As the reaction proceeded, the color of the solution turned into red brown, and white solid of MgCl$_2$ is precipitated. After stirring for 6 hours, the red-brown supernant solution was transferred into another flask to obtain 0.2 M solution of chelated titanium catalyst component[A1] in hexane-heptane solvent. This solution was used without further purification or separation.

Preparation of MgCl$_2$ Support Component[C] of Spherical Shape

MgCl$_2$ of spherical shape was prepared according to the known method. 192 g of magnesium powder was placed in a 10-liter reactor, and 200 ml of dibutylether was added to make a slurry mixture. 20 g of iodide and 500 ml of butylchloride were mixed together to make a purple solution in another flask. Then a 50 ml portion out of the 500 ml solution was taken out and added to magnesium powder at 80° C. After stirring the mixture for 15 min. at 80° C. to activate magnesium powder, the mixture of 200 ml of chlorobenzene and 2000 ml of dibutylether was added by a dropwise method for 3 hours. Then, additional 2400 ml of chlorobenzene was added by a dropwise method at 90° C. for 6 hours, and the temperature was maintained for additional 6 hours with continued stirring. Through the precipitation of the solid portion, supernant liquid portion was transferred into another flask to make Grignard reagent in dibutylether. 1200 ml(1000 mmol Mg content) of the Grignard solution prepared in the above was placed in a 10-liter reactor at 40° C. Then, 200 ml of carbontetrachloride was added by a dropwise method for 5 hours. The slurry mixture was stirred at 80° C. for 5 hours, and the solid MgCl$_2$ that was formed is washed with 2000 ml of hexane five times to prepare MgCl$_2$ of a spherical shape.

Immobilization of Chelated Titanium Catalyst Component[A1] on MgCl$_2$ 350 g of MgCl$_2$ was placed in a 10-liter flask with 2 liter of hexane at 50° C., and 175 mmol of chelated titanium catalyst component[A1] prepared in the above was added. Then the mixture was stirred for 3 hours at 50° C. The supernant liquid was decanted and washed with hexane to prepare a solid catalyst component. The titanium content of the solid catalyst component was 1.2 %.

Ethylene Polymerization

A 2-liter capacity autoclave, thoroughly purged with nitrogen and charged with 1000 ml of purified hexane, was purged with ethylene at the room temperature. The temperature was raised to 60 to 65° C. Then 3 milimoles of trioctylaluminum in hexane solution and 0.1 milimole, calculated as titanium atom, of the solid titanium catalyst component were added. The autoclave was sealed and pressurized with hydrogen until the total volume of hydrogen input was 500 ml. Then the total pressure was raised to 6 kg/cm$^2$.G with ethylene. The polymerization was carried out at 70° C. for 1 hour. After the polymerization, the polymer suspension was taken out when the inside temperature was lowered to 23° C. Then the polymer suspension was filtered on a filter to separate it into a polymer powder. The results of the analysis for the polymer are listed in Table 1.

Ethylene/1-hexene Copolymerization

A 2-liter capacity autoclave, thoroughly purged with nitrogen and charged with 1000 ml of purified hexane, was purged with ethylene at the room temperature. The temperature was raised to 60 to 65° C. Then 3 milimoles of triethylaluminum in hexane solution and subsequently 0.1 milimole, calculated as titanium atom, of the solid titanium catalyst component were added. 90 ml of 1-hexene was added and the autoclave was sealed and pressurized with hydrogen until the total volume of hydrogen input was 500 ml. Then the total pressure was raised to 6 kg/cm$^2$.G with ethylene, and the polymerization was carried out at 70° C. for 1 hour. After the polymerization, the polymer suspension was taken out when the inside temperature was lowered to 23° C. Then the polymer suspension was filtered on a filter to separate it into a polymer powder. The results of analysis for the copolymer are listed in Table 1.

EXAMPLE 2

Immobilization of Chelated Titanium Catalyst Component[A1] on the Silica Containing MgCl$_2$ Chelated titanium catalyst component[A1] prepared in Example 1 was used to prepare the solid catalyst component. 350 g of silica containing 4.0% MgCl$_2$ per g-silica which was obtained from Grace Davison CO. was placed in a 10-liter flask with 2 liter of hexane at 50° C. Then 175 mmol of chelated titanium catalyst component[A1] prepared in the above was added. The mixture was stirred for 3 hours at 50° C., and the supernant liquid was decanted and washed with hexane to prepare a solid catalyst component. The titanium content of the solid catalyst component was 1.7%.

Ethylene Polymerization and Ethylene/1-hexene Copolymerization

The polymerization was carried out in the same way as in the Example 1. The results are listed in Table 1.

EXAMPLE 3

Preparation of Chelated Titanium Catalyst Component[A2]

(a) Synthesis of 2-phenylamino-4-phenylimino-2-pentene 500 g of 2,4-pentanedione, 600 g of aniline, and 1000 g of MgSO$_4$ were mixed together at 100° C., and the mixed solution was stirred for 12 hours at 100° C. Then, the solid portion was precipitated, and the liquid portion was recrystallized upon addition of n-pentane to get 605 g of yellow 2-phenylimino-4-pentanone solid (70% yield). From the NMR analysis, the structure was confirmed; $^1$H-NMR (CDCl$_3$) δ1.98(s, CH$_3$), 2.10(s, CH$_3$), 5.18(s, =CH), 7.20 (m, Ph), 12.6(brs, NH).

Then, 605 g of 2-phenylimino-4-pentanone solid and 449 g of anilinehydrochloride were dissolved in 2000 ml of ethanol, and the solution was refluxed for 2 hours. After the solution was cooled at the room temperature, green solid was precipitated. The green solid was separated and dried under vacuum pumping. Then the solid was suspended in 1000 ml of diethylether, and 150 g of NaOH solution in 1200 ml of water was added. The slurry mixture was, then, stirred for 1 hour at the room temperature. Then an organic layer was separated and dried over MgSO$_4$. The solid was filtrated, and solvents were removed by vacuum pumping to get green solid. The green solid was recrystallized to get 650 g of solid (yield=75%). NMR analysis confirmed the structure; $^1$H-NMR(CDCl$_3$) δ1.95(s, 2CH$_3$), 4.93(s,=CH), 7.02 (m, Ph), 7.31(m, Ph), and 13.2(brs, NH).

(b) Synthesis of Chelated Titanium Catalyst Component [A2]

800 ml of hexane solution of 1 M of triethylaluminum (800 mmol) was placed in a 3-liter flask. Then 2400 mmol of 2-ethylhexanol was added by a dropwise method for 1 hour. While 2-ethylhexanol was added, gas was produced with mild heat. After the addition was finished, the mixture was stirred for additional 2 hours at the room temperature to complete the reaction. 400 ml of heptane solution of 1.0 M dibutylmagnesium was added to Al(OR)$_3$ solution prepared in the above at the room temperature and stirred for 2 hours to prepare Mg[AlR'(OR)$_3$]$_2$ in hexane-heptane mixed solution (R=2-ethylhexyl, R'=butyl, isobutyl).

Then, Mg[AlR'(OR)$_3$]$_2$ solution was added to 100 g of 2-phenylamino-4-phenylimino-2-pentene prepared in the above in a 3-liter flask and stirred for 3 hours at the room temperature. The reaction produced mild heat, and as the reaction proceeded, the color of the solution turned into a pale yellow, and, finally, resulted in a clear pale yellow solution of Mg—Al complex containing carbodiimide ligand. The total solution volume was 1400 ml.

Meanwhile, 133.7 g of TiCl$_4$(THF)$_2$ was placed in a 5-liter flask, and 600 ml of hexane was added to make a slurry solution. The 1400 ml of Mg—Al complex solution prepared in the above was added to TiCl$_4$(THF)$_2$ slurry mixture and stirred for 6 hours. As the reaction proceeded, the color of the solution turned into a red brown, and a white solid of MgCl$_2$ was precipitated. After stirring for 6 hours, the red-brown supernant solution was transferred into another flask to obtain 0.2 M solution of chelated titanium catalyst component[A2] in hexane-heptane solvent. This solution was used without further purification or separation.

(c) Immobilization of Chelated Titanium Catalyst Component on MgCl$_2$ 350 g of MgCl$_2$ was placed in a 10-liter flask with 2 liter of hexane at 50° C. Then 175 mmol of chelated titanium catalyst component[A2] prepared in the above was added. The mixture was stirred for 3 hours at 50° C., and the supernant liquid was decanted and washed with hexane to prepare solid catalyst component. The titanium content of the solid catalyst component was 1.8%.

Ethylene Polymerization and Ethylene/1-hexene Copolymerization

The polymerization was carried out in the same way as in the Example 1. The results are listed in Table 1.

EXAMPLE 4

Preparation of Chelated Titanium Catalyst Component[A3]

The catalyst component[A3] was prepared in the same way as in the Example 1 except the chelate ligand was phenylisocyanate, and immobilization procedure was same as that of the Example 1 to get the solid catalyst component. The titanium content of the solid catalyst component was 2.1%.

Ethylene Polymerization and Ethylene/1-hexene Copolymerization

The polymerization was carried out in the same way as in Examples 1. The results are listed in Table 1.

Comparative Example 1

Solid Catalyst Component Preparation

MgCl$_2$ support having a spherical shape was prepared in the same way as in the Example 1, and the solid catalyst component was prepared in the same way as in the Example 1 except using TiCl$_4$ in the place of chelated titanium catalyst component[A1].

Ethylene Polymerization and Ethylene/1-hexane Copolymerization

The polymerization waw carried out in the same way as in the Example 1. The results are listed in Table 1.

TABLE 1

Results of Ethylene and Ethylene/1-hexene copolymerization

| Examples | ethylene polymerization | | | | ethylene/1-hexene copolymerization | | | |
|---|---|---|---|---|---|---|---|---|
| | activity (a) | M.I. (b) | MFRR (c) | B/D (d) | M.I. (b) | MFRR (c) | ΔH (J/g) (e) | Tm (° C.) |
| Example (1) | 2200 | 0.7 | 25.3 | 0.42 | 1.2 | 25.3 | 107 | 123.3 |
| Example (2) | 1200 | 0.3 | 26.1 | 0.40 | 0.95 | 24.1 | 105 | 123.6 |
| Example (3) | 1500 | 0.5 | 26.2 | 0.42 | 1.5 | 24.2 | 105 | 122.1 |
| Example (4) | 1260 | 0.6 | 26.3 | 0.41 | 1.6 | 25.3 | 104 | 122.3 |
| Comparative Example (1) | 2500 | 0.6 | 29.3 | 0.37 | 1.2 | 30.3 | 105 | 125 |

(a) g-PE/mmol-Ti.hr
(b) Melt Index: 2.16 Kg/10 min. at 230° C.
(c) Melt Flow Ratio: 21.6 kg/2.16 kg, 10 min. at 230° C.
(d) Bulk Density: g/cm$^3$
(e) C6 content = 7.0~7.1%

EXAMPLE 5

Preparation of Chelated Titanium Catalyst Component[A1] in Solution 800 ml of hexane solution of 1 M triethylaluminum(800 mmol) was placed in a 3-liter flask and 2400 mmol of 2-ethylhexanol was added by a dropwise method for 1 hour. While 2-ethylhexanol was added, gas was produced with mild heat. After the addition was finished, the mixture was stirred for additional 2 hours at the room temperature to complete the reaction. Then 400 ml of heptane solution of 1.0 M dibutylmagnesium was added to Al(OR)$_3$ solution prepared in the above at the room temperature and stirred for 2 hours to prepare Mg[AlR'(OR)$_3$]$_2$ in hexane-heptane mixed solution (R=2-ethylhexyl, R'=butyl, isobutyl). Then Mg[AlR'(OR)$_3$]$_2$ solution was added to 82.4 g of dicyclohexylcarbodiimide in a 3-liter flask and stirred for 3 hours at the room temperature. The reaction produced mild heat. As the reaction proceeded, the color of the solution turned into a pale yellow, and finally resulted in a clear pale yellow solution of Mg—Al complex containing carbodiimide ligand. The total solution volume was 1400 ml.

Meanwhile, 133.7 g of TiCl$_4$(THF)$_2$ was placed in a 5-liter flask, and 600 ml of hexane was added to make a slurry solution. The 1400 ml of Mg—Al complex solution prepared in the above was added to TiCl$_4$(THF)$_2$ slurry mixture and stirred for 6 hours. As the reaction proceeded, the color of the solution turned into red brown, and white solid of MgCl$_2$ was precipitated. After stirring for 6 hours, the red-brown supernant solution was transferred into another flask to obtain 0.2 M solution of chelated titanium catalyst component[A1] in hexane-heptane solvent. This solution was used without further purification or separation.

Ethylene Polymerization

A 2-liter capacity autoclave, thoroughly purged with nitrogen and charged with 1000 ml of purified hexane, and purged with ethylene at room temperature. The temperature was raised to 60 to 65° C. Then 3 milimoles of trioctylaluminum in hexane solution and 0.5 g silica containing 4.5% MgCl$_2$ which was obtained from Grace Davison Co. were added. And subsequently 0.3 milimole of chelated titanium catalyst component[A1] solution, calculated as titanium atom, was added. The autoclave was sealed and pressurized with hydrogen until the total volume of hydrogen input was 500 ml. Then the total pressure was raised to 6 kg/cm$^2$.G with ethylene, and the polymerization was carried out at 70° C. for 1 hour. After the polymerization, the polymer suspension was taken out when the inside temperature was lowered to 23° C., and was filtered on a filter to separate it into a polymer powder. The results of analysis for the polymer are listed in Table 2.

Ethylene/1-hexene Copolymerization

A 2-liter capacity autoclave, thoroughly purged with nitrogen and charged with 1000 ml of purified hexane, was purged with ethylene at the room temperature. The temperature was raised to 60 to 65° C. Then 3 milimoles of triethylaluminum in hexane solution, 0.5 g of silica containing 4.5% MgCl$_2$ which was obtained from Grace Davison Co., and 0.3 milimole of chelated titanium component[A1] solution, calculated as titanium atom, were added. Also, 120 ml of 1-hexene was added. Then the autoclave was sealed and pressurized with hydrogen until the total volume of hydrogen input was 500 ml. The the total pressure was raised to 6 kg/cm$^2$.G with ethylene, and the polymerization was carried out at 70° C. for 1 hour. After the polymerization, the polymer suspension was taken out when the inside temperature was lowered to 23° C. Finally the polymer suspension was filtered on a filter to separate it into a polymer powder. The results of analysis for the copolymer are listed in Table 2.

EXAMPLE 6

The chelated titanium catalyst component[A3] in solution was prepared in the same way as in Example 5 except the chelate ligand was phenylisocyanate, and the solution was used without further purification. Ethylene polymerization and ethylene/1-hexene copolymerization were carried out in the same way as in the Example 5, and the results are listed in Table 2.

Comparative Example 2

Preparation of Liquid Titanium Catalyst Component [D] without Amide Chelating Ligand 800 ml of hexane solution of 1 M triethylaluminum(800 mmol) was placed in a 3-liter flask. 2400 mmol of 2-ethylhexanol was added by a dropwise method for 1 hour. While 2-ethylhexanol was added, a gas was produced with mild heat. After finishing addition, the mixture was stirred for additional 2 hours at the room temperature to complete the reaction. 400 ml of heptane solution of 1.0 M dibutyl-magnesium was added to $Al(OR)_3$ solution prepared above at the room temperature and was stirred for 2 hours to prepare $Mg[AlR'(OR)_3]_2$ in hexane-heptane mixed solution (R=2-ethylhexyl, R'=butyl, isobutyl). Meanwhile, 133.7 g of $TiCl_4(THF)_2$ was placed in a 5-liter flask, and 600 ml of hexane was added to make a slurry solution. The 1400 ml of $Mg[AlR'(OR)_3]_2$ in the hexane-heptane mixed solution (R=2-ethylhexyl, R'=butyl, isobutyl) was added to $TiCl_4(THF)_2$ slurry mixture and stirred for 6 hours. As the reaction proceeded, the color of solution turned into red brown, and white solid of $MgCl_2$ was precipitated. After stirring for 6 hours, the supernant red solution was transferred into another flask to obtain 0.2 M solution of liquid titanium catalyst component[D] in hexane-heptane solvent. This solution was used without further purification or separation.

Ethylene Polymerization and Ethylene/1-hexene Copolymerization

The polymerization was carried out in the same way as in the Example 5 except the titanium catalyst component[D] prepared in the above was used instead of the chelated titanium catalyst component[A1]. The results are listed in Table 2.

prepare 16 kg of prepolymerized catalyst at 50° C. The Melt Index(2.16 kg/10 min. at 230° C.) of prepolymer was 1.3.

(b) Gas Phase Polymerization

The prepolymerized catalyst was fed to fluidizing gas phase reactor with continuous feeding of ethylene, hydrogen, and 1-hexene to polymerize ethylene/1-hexene copolymer having Melt Index (2.16 kg/10 min. at 230° C.) of 0.9 and density of 0.917 $g/cm^3$. As a result, 5.8 kg of copolymer per hour was produced with a total gas phase reactor pressure of 20 $kg/cm^2$-G and, the reactor's temperature was 80° C. The results of the analysis of copolymer are listed in Table 3. As shown in Table 3, the polymer produced by the catalytic system according to this invention shows a narrow M.W.D. having melt flow ratio of about 24 and narrow compositional distribution with low melting point of about 122° C. Also, because of the excellent falling dart impact strength, we can tell that the purpose of this invention is fulfilled. Thus, the polymer produced with the catalytic system of this invention is suitable to make super hexene

TABLE 2

Results of Ethylene and Ethylene/1-hexene copolymerization

| | ethylene polymerization | | | | ethylene/1-hexene copolymerization | | | |
|---|---|---|---|---|---|---|---|---|
| Examples | activity (a) | M.I. (b) | MFRR (c) | B/D (d) | M.I. (b) | MFRR (c) | ΔH (J/g) (e) | Tm (° C.) |
| Example (5) | 400 | 0.5 | 24.3 | 0.39 | 0.45 | 23.3 | 95 | 122 |
| Example (6) | 300 | 0.6 | 25.2 | 0.38 | 0.55 | 24.7 | 92 | 123 |
| Comparative Example (2) | 400 | 0.6 | 29.3 | 0.37 | 0.6 | 30.2 | 94 | 125 |

(a) g-PE/mmol-Ti.hr
(b) Melt Index: 2.16 Kg/10 min. at 230° C.
(c) Melt Flow Ratio: 21.6 kg/2.16 kg, 10 min. at 230° C.
(d) Bulk Density: $g/cm^3$
(e) C6 content = 7.0~7.1%

EXAMPLE 7

Gas Phase Pilot Scale Polymerization (a) Prepolymerization

The solid titanium catalyst component[A1] prepared in the Example 1 and trioctylaluminum as a cocatalyst component[B] were used. 1.8 mole of trioctylaluminum was injected into the reactor containing 85 liter of hexane and 800 g of the solid titanium catalyst component[A1]. The appropriate amount of ethylene and hydrogen were fed to grade film which has characteristic feature of having much higher falling dart impact strength than conventional copolymers.

Comparative Example 3

The solid catalyst component prepared in the Comparative Example 1 and trioctylaluminum as a cocatalyst component were used. The prepolymerization and gas phase polymerization was done in the same way as in the Example 7. The results of the analysis of copolymer are listed in Table 3.

TABLE 3

The analysis results of Ethylene/1-hexene copolymer of Gas phase polymerization

| Examples | M.I. | density (1) | MFRR (2) | C6 % | Tm (° C.) | ΔH (J/g) | FDI (g) | Hexane extractable |
|---|---|---|---|---|---|---|---|---|
| Example (7) | 0.92 | 0.917 | 24.1 | 7.2 | 122.3 | 102 | 710 | 2.1% |
| Comparative Example (2) | 0.91 | 0.917 | 30.3 | 7.3 | 125.6 | 103 | 250 | 6.2% |

(1) $g/cm^3$
(2) Melt Flow Ratio: 21.6 kg/2.16 kg, 10 min. at 230° C.

What is claimed is:

1. A method for producing a catalyst for olefin polymerization, said method comprising the steps of:
   (1) reacting a compound of $Mg[AlR'(OR)_3]_2$ with a chelate ligand to obtain a complex compound containing Mg—Al-chelate ligand, wherein the chelate ligand is selected from a group consisting of carbodiimide compounds, 2-phenylamino-4-phenyl-imino-2-pentene, and phenylisocyanate; and
   (2) reacting said complex compound with a transition metal halide compound, $MX_4$, to obtain a chelated transition metal compound,
   wherein R and R' are independently alkyl or aryl group, M is Ti or Zr, and X is a halogen atom.

2. A method for producing a catalytic system for olefin polymerization, said method comprising:
   (a) producing a catalyst using the method according to claim 1, the catalyst being in the form of solid catalyst supported on $MgCl_2$ or silica containing $MgCl_2$ of spherical shape, and
   (b) providing organoaluminum compound as a cocatalyst.

3. A method for producing a catalytic system for olefin polymerization, said method comprising:
   (a) producing a catalyst using the method according to claim 1, the catalyst being in the form of solution;
   (b) providing separate $MgCl_2$ or silica containing $MgCl_2$ of spherical shape; and
   (c) providing organoaluminum compound as a cocatalyst.

4. The method according to claim 2 or 3, wherein the organoaluminum compound is represented by $R_nAlCl_{3-n}$ (where R is aliphatic hydrocarbon and n is 2 or 3), and the catalytic system does not comprise methylaluminoxane (MAO) at all.

5. A process for olefin polymerization comprising producing a catalytic system using the method according to claim 2 or 3, and using the catalytic system for polymerization.

6. The process for olefin polymerization according to claim 5, wherein the polymerization is gas phase polymerization or slurry phase polymerization.

* * * * *